March 6, 1973  T. STEELE ET AL  3,719,431

BLADES

Filed Sept. 25, 1970  3 Sheets-Sheet 1

United States Patent Office 3,719,431
Patented Mar. 6, 1973

3,719,431
BLADES
Thomas Steele, Littleover, George Oswald Eccles, Skipton, and Douglas Herbert Williamson, Derby, England, assignors to Rolls-Royce Limited, Derby, England
Filed Sept. 25, 1970, Ser. No. 75,545
Claims priority, application Great Britain, Sept. 26, 1969, 47,612/69
Int. Cl. F01d 5/18
U.S. Cl. 416—96     4 Claims

ABSTRACT OF THE DISCLOSURE

This device concerns a hollow gas turbine engine blade being provided with a solid metal blade stub, the joint between the hollow blade and stub being reinforced by providing a reinforcement collar which is attached to both the stub and the hollow blade.

---

The present invention relates to a method of manufacturing blades, such as turbine blades for gas turbine engines and to blades made by such a method. The invention is particularly though not exclusively concerned with the production of hollow blades, such as blades formed from sheet metal.

Whilst it is relatively simple to fold sheet metal into an aerofoil form required for the blade, difficulties arise in the fixing of the formed blade to a disc. The present invention seeks to provide a solution to these difficulties.

The present invention provides a method of attaching a hollow blade to a root fixing portion in which the root fixing portion includes at least a stub member and a collar, the method including the steps of inserting an aerofoil shaped projection of the stub member into the root of the blade, securing the aerofoil projection to the blade root and the collar to the blade root and to the stub member and forming securing means on the stub member.

The blade root can terminate above the attachment means and preferably the collar is split for ease of manufacture.

Sealing lands and lightening recesses may be formed on the root fixing portion, particularly on the stub member.

The elements of the root fixing portion may be secured to each other and to the blade root by diffusion bonding/brazing.

The attachment means is preferably of the fir tree type although other types of attachment are equally suitable.

The hollow blade may be cast although the invention is particularly applicable to a laminated sheet metal blade in which at least one of the laminations is provided with the shallow channels so that when the individual sheets are laminated and folded to form a blade, the channels in combination with the other sheet or sheets form passages for the flow of cooling air in the wall of the blade.

The present invention also provides a hollow blade as manufactured by the method described above.

The present invention will now be more particularly described with reference to the accompanying drawing in which FIGS. 1, 2 and 3 show three stages in the manufacture of a blade in accordance with the method of the present invention and FIG. 3 in particular shows a completed blade in accordance with the present invention.

Figure 1:
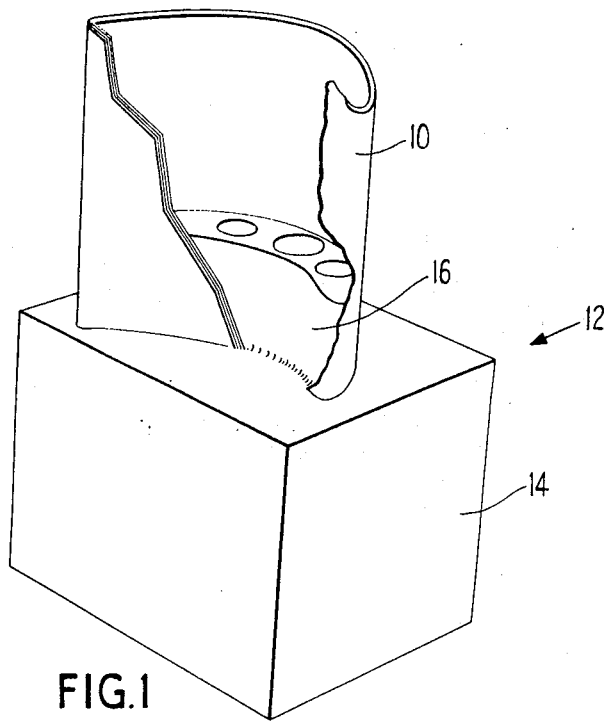

FIG. 1 shows a part of blade 10 which has been formed by folding a sheet metal laminate to the required aerofoil shape, cord and span. The lamination consists of three layers of sheet metal, the central layer being formed with a series of shallow channels on both sides. In combination with the outer layers these channels form cooling passages for the flow of cooling air in the wall of the blade. A stub member 12 has a rectangular base 14 and an aerofoil section projection 16 which is inserted into the root of the blade 10. The projection 16 is shaped so that it is in contact with a major portion of the internal surface of the root of the blade 10 and these two parts are secured together by a brazing process. The projection 16 is sprayed with a brazing alloy and frozen and is then forced into the blade root which has been heated. This process results in a good interference fit and corresponding intimate contact between the blade root and the projection which is essential for a good bond to be produced by brazing.

Figure 2:
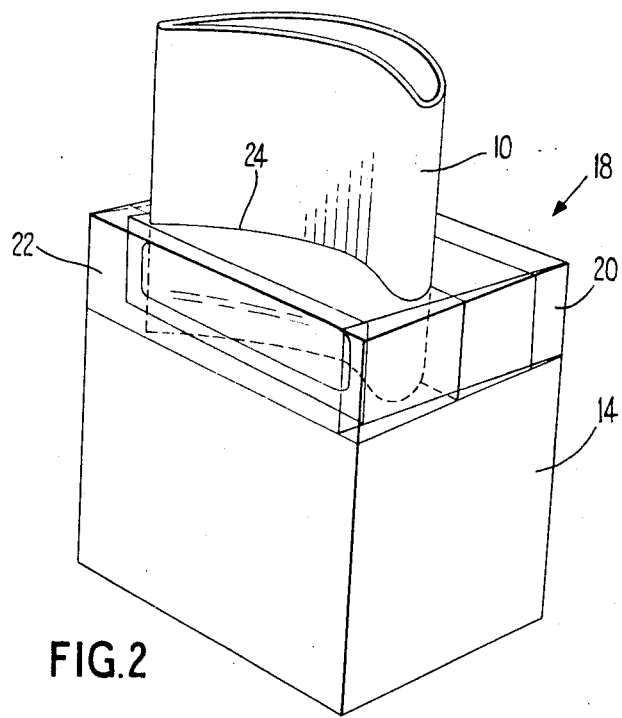

In FIG. 2 a collar 18 which is in two halves 20, 22 is placed around the blade root in contact with the root and the upper surface 15 of the stub member. The collar halves 20 and 22 are shaped on their inner faces to co-operate with the convex and concave surfaces respectively of the blade root. Prior to the positioning of the collar, the outer surface of the blade root is sprayed with a brazing alloy, the collar is then placed in position, clamped to the blade root and the assembled blade is placed in a furnace for the brazing operation in which the sprayed parts of the blade root and the root fixing portion are bonded together. In addition the blade root and the collar are also bonded by a fillet 24 of brazing alloy extending around the profile of the root.

Figure 3:
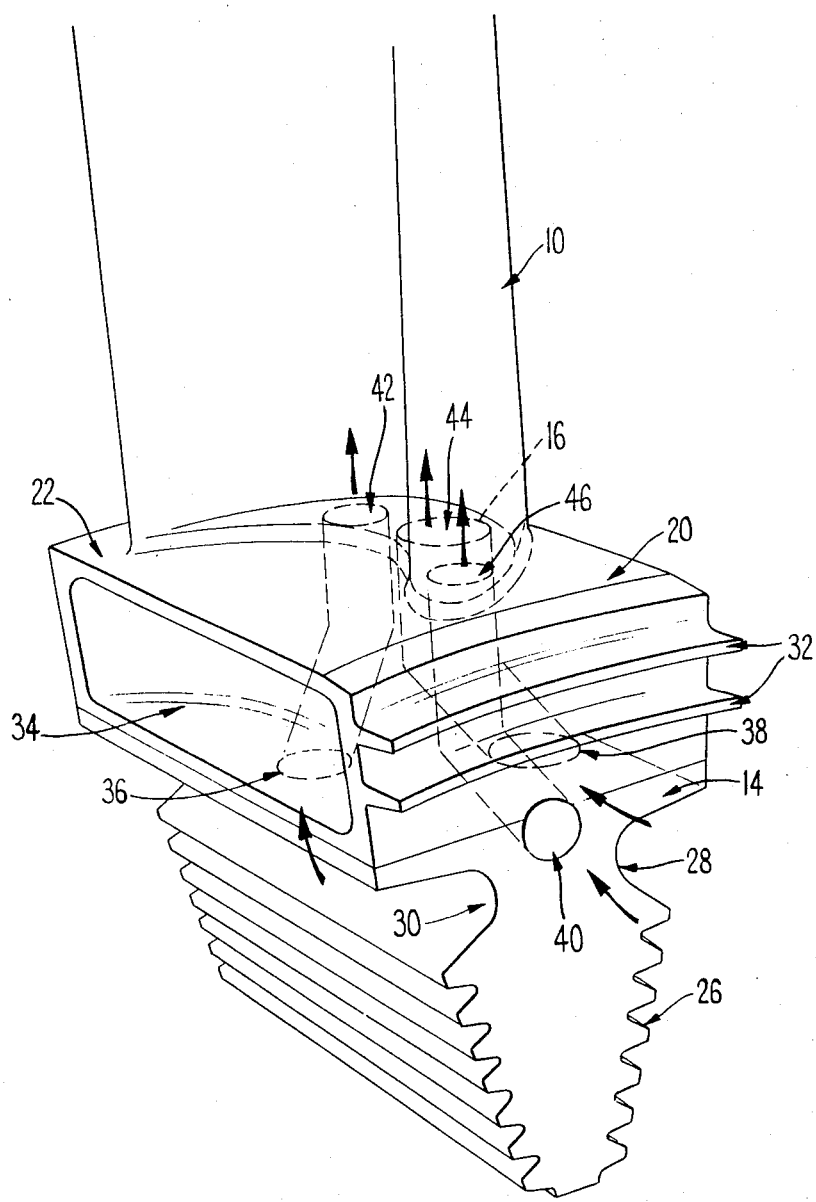
Figure 4:
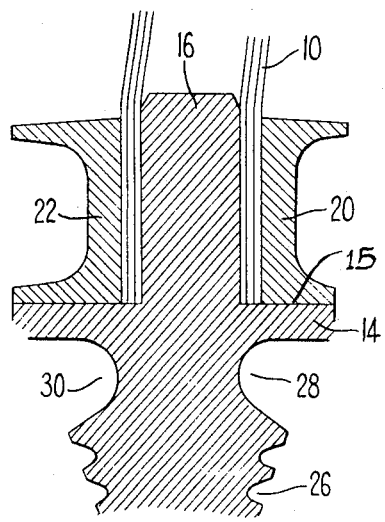
FIG. 4 is a section of line 4—4 in FIG. 3.

In FIGS. 3 and 4 which show the completed blade apart from a portion of the span, the stub member 14 has been machined to provide a fir tree fixing 26 and radii 28, 30 to avoid high stress concentrations. The two portions of the collar have also been machined to form sealing lands 32 and recesses 34 which define spaced flanges and to reduce the weight of the blade and the consequential loads due to centrifugal forces. The recesses 34 are preferably formed by electrochemical machining. Holes 36, 38 and 40 are bored through the root fixing portion to communicate with holes 42, 44 and 46 which are bored in the projection 16 prior to assembly with the blade.

In use, the centrifugal load of the blade is fed via the projection 16 and the collar halves 20, 22 into the fir tree fixing 26 and is therefore transferred from the blade to the fir tree partly through the solid material of the stub member and partly as a tensile force acting across the brazed joints connecting the collar halves to the stub member.

The blade 10 terminates short of the attachment means 26, that is to say, no part of blade runs out into any of the serrations of the fir tree fixing in order to prevent any discontinuities in the serrations and consequent weaknesses.

Figure 5:
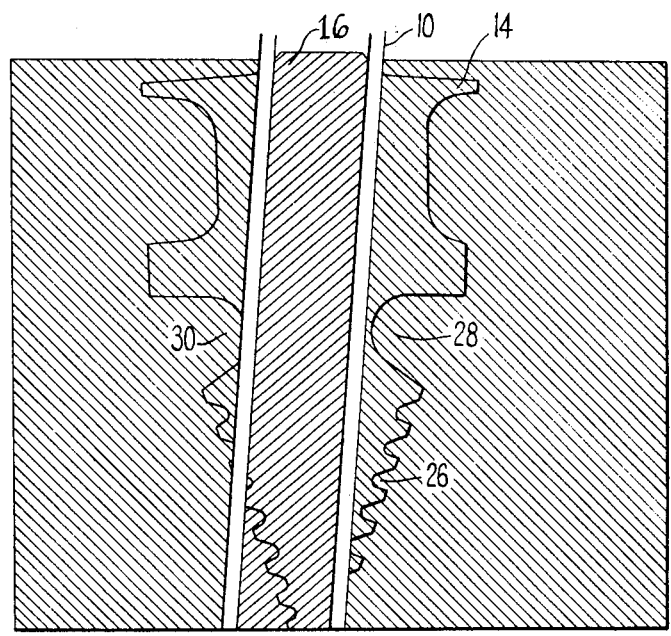
FIG. 5 is a cross-section through part of a blade manufactured in accordance with a further method according to the present invention.

In FIG. 5, the projection 16 is aerofoil shaped in cross-section and fits inside the hollow blade 10 and the two halves 20, 22 of the collar 18 are placed around the blade. The stub member 16 and the collar 18 are attached to the blade by the method as described with reference to FIGS. 1 to 4. The collar is then machined to the shape outlined in heavy line in the figure to provide the fir tree fixing 26, radii 28 and 30, sealing lands 32 and recesses 34. Whilst this type of blade may well not be acceptable under some circumstances because of the reasons mentioned above, the blade may be suitable if the loading conditions are favourable.

What is claimed is:

1. A hollow blade for use in a fluid flow machine, said blade comprising a root portion, a stub member having a platform portion extending generally laterally from said blade, attachment means extending from one side of said platform portion, a projection extending generally perpendicularly from the other side of said platform portion a predetermined distance, said projection being of a shape to closely interfit with said root portion of said hollow blade, said projection being disposed in and secured to said root portion, a collar formed in two parts, said two parts of said collar each having recessed portions defining inner flanges mounted on said platform portion of said stub member and outer flanges which form, when said blade is mounted in a said flow machine with other blades and in cooperation with adjacent blades, a fluid flow path, said parts of said collar having wall portions extending between said inner and outer flanges, said wall portions surrounding and secured to said root portion of said hollow blade, said wall portions having a width as measured perpendicularly from said platform portion approximately equal to said predetermined distance of said projection's extent from said platform portion.

2. A blade according to claim 1 in which the blade terminates short of the attachment means.

3. A blade according to claim 1 in which the attachment means is in the form of a fir tree root.

4. A blade according to claim 1 in which sealing lands are formed on the collar.

References Cited

UNITED STATES PATENTS

| 2,699,598 | 1/1955 | Daugherty | 416—96 UX |
| 2,848,193 | 8/1958 | Sells et al. | 416—92 |
| 3,554,663 | 1/1971 | Helms | 416—95 X |

FOREIGN PATENTS

| 780,447 | 7/1957 | Great Britain | 416—96 |
| 1,801,475 | 10/1968 | Germany | 416—96 |
| 738,656 | 10/1955 | Great Britian | 416—96 |
| 329,868 | 6/1958 | Switzerland | 416—96 |

EVERETTE A. POWELL, JR., Primary Examiner

U.S. Cl. X.R.

416—219